(No Model.)

W. R. SCOTT.
TROLLEY WIRE HANGER.

No. 538,391. Patented Apr. 30, 1895.

WITNESSES:
Chas. F. Burkhardt
F. Gustav Wilhelm

Walter R. Scott
INVENTOR.
By Wilhelm Bonner
ATTORNEYS.

UNITED STATES PATENT OFFICE.

WALTER R. SCOTT, OF BUFFALO, NEW YORK.

TROLLEY-WIRE HANGER.

SPECIFICATION forming part of Letters Patent No. 538,391, dated April 30, 1895.

Application filed March 5, 1895. Serial No. 540,575. (No model.)

*To all whom it may concern:*

Be it known that I, WALTER R. SCOTT, a citizen of the United States, residing at Buffalo, in the county of Erie and State of New York, have invented a new and useful Improvement in Trolley-Wire Hangers, of which the following is a specification.

This invention relates to that class of trolley hangers or supports which are provided with a longitudinal seat or groove in which the trolley wire is retained by a clamping device bearing against the wire.

My invention has for its object to provide the hanger with a simple clamping device which firmly holds the wire in its seat and which is reliably locked in position.

Figure 1:
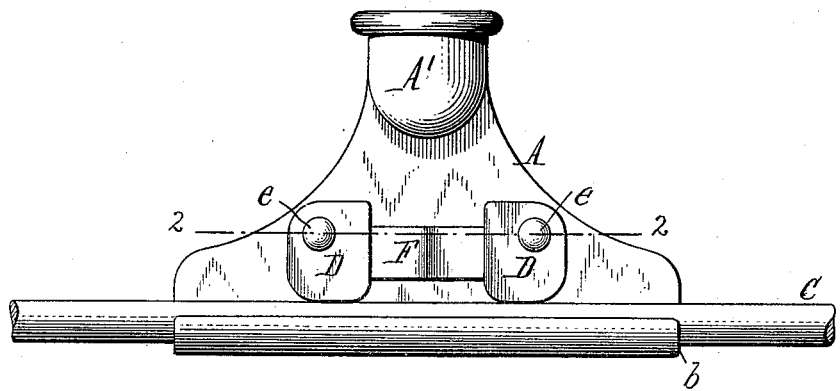
Figure 2:
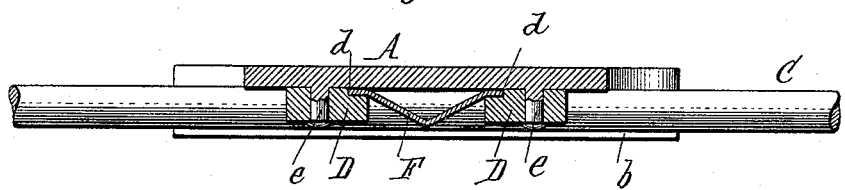
Figure 3:
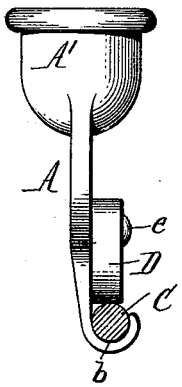

In the accompanying drawings, Figure 1 is a side elevation of my improved hanger attached to a trolley-wire. Fig. 2 is a horizontal section thereof in line 2 2, Fig. 1. Fig. 3 is an end view showing the trolley-wire in cross-section.

Like letters of reference refer to like parts in the several figures.

A is an upright plate forming the body of the hanger and having at its upper end a socket or enlargment A', or other suitable means for attaching it to the usual span or cross wire, or to the arm of a trolley pole. The body A is provided at its enlarged lower end with a seat $b$ which receives the trolley wire C and which consists preferably of a longitudinal lip or flange, of curved cross section, extending laterally from the lower portion of the hanger body.

D D represent a pair of clamping cams or eccentrics arranged on the body A, above the seat or lip $b$, and adapted to bear with their lower faces against the upper side of the trolley wire, so as to hold the latter tightly in its seat. These cams or eccentrics are mounted upon horizontal studs or pivots $e$ projecting from the adjacent side of the body and having their outer ends headed or upset to retain the cams thereon. These cams are preferably so pivoted that the greatest radius of each is on the inner side of its pivot, whereby both cams clamp the trolley wire when turned outward, or in the direction of the arrows shown in Fig. 1, while releasing their grip on the wire when turned in the opposite direction. By this arrangement, in case the wire is subjected to a pull or strain tending to draw it lengthwise in its seat, it is always gripped by at least one of the cams, and in the event of the wire breaking on either side of the hanger, the section thereof on the opposite side of the hanger will be held in engagement with the hanger by the adjacent cam. For instance, if the trolley wire should become severed on the right hand side of the hanger, the portion thereof seated in the lip $b$ will be retained in place by the cam on the left hand side of the hanger, thus preventing both sections of a parted wire from becoming detached from the hanger. The cams are caused to grip the trolley wire more tightly the greater the longitudinal strain upon the wire.

F is a lock whereby the cams or eccentrics are prevented from turning out of their clamped position and releasing the trolley wire. This lock preferably consists of a V-shaped spring or spring plate arranged horizontally between the two cams or eccentrics and bearing with its ends against the opposing portions of the same. The end portions of the locking spring are bent parallel with the side of the hanger body and are seated in vertical recesses or rabbets $d$ formed in the opposing edges of the cams, as shown in Fig. 2, whereby the spring is confined against outward displacement between the recessed portions of the cams and the adjacent side of the hanger body. The locking spring, while preventing the cams from turning toward each other and releasing the wire, permits a sufficient outward movement of the lower portions of the cams to firmly grip the wire, in case the latter receives a longitudinal strain.

In applying the trolley wire to the hanger, the cams are turned inward sufficiently to permit the wire to be placed in its seat. After inserting the wire, the cams are turned outward to clamp the wire, and the locking spring is then inserted in the recesses of the cams by introducing it from the upper ends of the latter. When it is desired to release the wire for making repairs, or for any other purpose, the spring is withdrawn from the recesses of the cams, whereupon the latter can be turned for releasing the wire. The hanger is preferably constructed of brass or other malleable metal and its lip $b$ and the pivots of the clamping cams are formed integrally therewith.

I claim as my invention—

1. In a trolley wire hanger, the combination with the body of the hanger provided at its lower end with a laterally extending lip or flange extending from end to end of the body and forming a seat for the trolley wire, of a clamping cam or eccentric pivoted to the body above said lip or flange and adapted to bear against the trolley wire, substantially as set forth.

2. The combination with the body of the hanger provided with a seat for the trolley wire, of a pair of cams or eccentrics pivoted to the body above said seat, and a lock engaging with said cams or eccentrics, substantially as set forth.

3. The combination with the body of the hanger provided with a seat for the trolley wire, of a pair of cams or eccentrics pivoted to the body above said seat, and a locking device interposed between said cams and bearing against the opposing edges thereof, substantially as set forth.

4. The combination with the body of the hanger provided with a seat for the trolley wire, of a pair of cams or eccentrics pivoted to the body above said seat and provided in their opposing edges with upright recesses, and a V-shaped locking spring arranged with its end portions in the recesses of said cams or eccentrics, substantially as set forth.

Witness my hand this 23d day of February, 1895.

WALTER R. SCOTT.

Witnesses:
JNO. J. BONNER,
KATHRYN ELMORE.